United States Patent Office 3,284,616
Patented Nov. 8, 1966

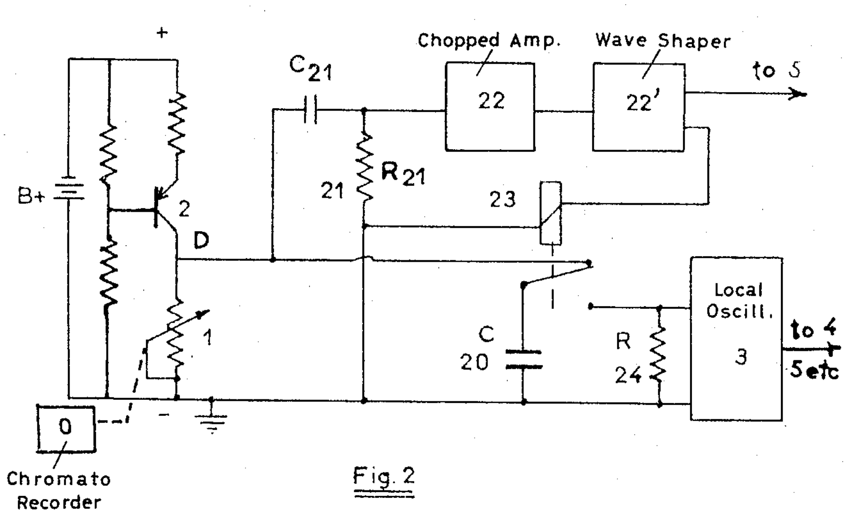
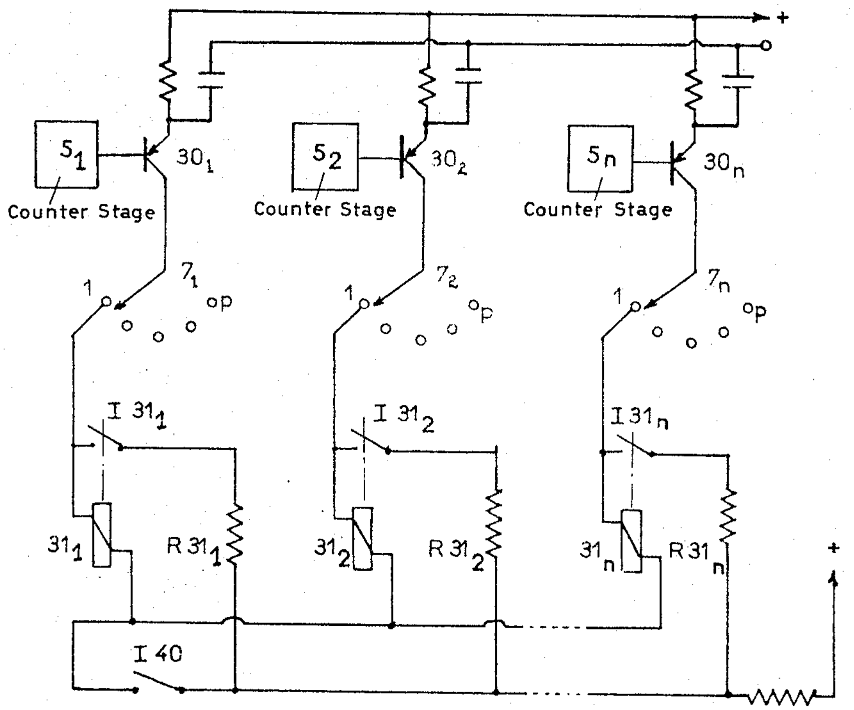
Fig. 3

3,284,616

MEMORY DEVICES FOR STORING THE PEAK, INSTANTANEOUS OR INTEGRAL VALUES OF THE VARIABLE INPUT

Herbert Ernyei and Claude Le Rohellec, Paris, France, assignors to Societe Lignes Telegraphiques et Telephoniques, Paris, France, a joint-stock company of France Filed Oct. 26, 1962, Ser. No. 233,362
Claims priority, application France, Nov. 8, 1961, 878,278; Oct. 30, 1962, 910,853
5 Claims. (Cl. 235—150.5)

The invention is concerned with storage devices for binary memorizing information which are of particular interest when such information is supplied by an instrument. The storage devices according to the invention match any kind of instrument whatever be the measuring process. Most users are interested in storing one or the other or each of the following values:

Instantaneous value of the input at a given time.
Peak value of the input which may vary while measurement is carried on.
Integral with respect to time of the function which represents the variations of the parameter while measurement is carried on.

The memory devices according to the invention can be used to store any kind of information. However, the description carried on will relate mainly to the above cases relating to measurements. Irrespective of the type of measurement which is required from an instrument either in the case of in-line industrial measurement or at the laboratory, use of the memory devices allows expanding its range of the operation. These devices are very helpful for in-line testing, multiplex metering or telemetering, as well as industrial process automation since they are fit to supply a direct or remote control loop.

The memory devices according to the invention comprise the following parts:

A timing generator.
A matching or transducing unit.
A frequency modulated local oscillator.
An electronic binary counter with integral action.
A switching matrix unit.
A memory.

The timing generator is the time base of the complete unit and it sets up the sequence of the operations: start, duration of one cycle, zero reset, zero checking, etc.

The transducing unit has a double purpose. It transduces the input to the memory device (such as the output from an instrument) into an electrical value which follows the same law of variation with respect to time and it performs on such time varying value, the transformation into a time varying voltage which characterizes the type of value to be filed into the memory (instantaneous value, peak value, integral value . . .). Therefore, it is appreciated that the matching unit is to be designed for each specific application. When the value to be fed into the memory is the peak value, the matching unit incorporates a transducer and a unidirectional network which will store the instantaneous value of the input.

The local oscillator is frequency modulated by the output from the transducer so as to deliver an output signal the instantaneous frequency of which reproduces the variations of the value to be stored with respect to time. Said instantaneous frequency value is counted up by the electronic binary counter which keeps on summing up the frequency varying pulses for the duration of one operation. At the end of such period, the count from the counter is transferred at the proper place in the memory by the switching matrix. The different phases of operation are time controlled by the timing generator.

It is therefore an object of the invention to provide for a multi purpose memory unit self operating to store as a binary information an analog signal such as the output from an instrument.

It is an object of the invention to provide for a self-operating memory device including means to transduce the input value according to a preset program.

It is an object of the invention to provide for a self-operating high precision digital memory device which stores a preset function of a set of analog input values for any duration.

It is an object of the invention to provide for a digital memory device which stores such functions of the analog input as instantaneous values, peak values, values integrated with respect to time.

It is an object of the invention to provide for a peak value digital memory device the precision of which is independent of the operating temperature conditions.

It is another object of the invention to provide for an economical digital memory unit with an analog input.

The use of the device according to the invention in connection with a gaseous chromatograph analyzer has been chosen only by way of illustration and it is in no way intended to limit thereby the scope of the invention.

The invention will be fully understood by referring to the following description and the accompanying drawings in which:

FIGURE 2 is a block diagram of a device according to the invention to store the peak value of the output from a chromatograph.

FIGURE 3 is a detailed diagram of the memory unit.

It is necessary to describe briefly the operation of a gas chromatograph analyzer in order to fully understand how the devices of the present invention belong to the system, although the gas chromatograph is by no means the object of such invention and could be replaced by any type of instrument. The object of a gas chromatograph analyzer is to identify the various constituents of a gaseous mixture and to deliver a signal corresponding to their relative concentration. The operating principle of this kind of instrument is as follows. A sample of the gaseous mixture is transferred by a carrier gas through one or several diffusion columns filled with an inert material. The speed of diffusion of each gas is related to its molecular weight. At the outlet of the columns a balanced heated wire anemometer is placed which received both a current of carrier gas alone and the gaseous output from the column. The anemometer supplies a quantitative information on the instantaneous concentration of the gas carried in the carrier gas flow after diffusion through the columns. Owing to the difference in diffusion speed, the nature of the diffused gas is readily identified after a previous calibration using the carrier gas and several known gases. The analyzer output is usually fed to a recorder of the pentype. The pen position is related to the quantity of gas coming out from the column at the considered instant. A time base is usually incorporated in the instrument in order to synchronize the recorder with the arrival of the gas sample in the diffusion unit. Such time base is designed so as to deliver timing information during the course of a measurement together with the start information. Therefore, in this particular case of application, it is possible to use the time base of the instrument as the timing generator unit of the device according to the invention. However, this is not the most general case of application and the memory device incorporates an independent timing generator. There are two different ways of using a gas analyzer which complete one another. First as an analyzer which delivers signals corresponding to the relative concentration of the constituents, secondly as a peak detector which delivers the maximum value of the flow (or concentration) of each constituent. In the first type of operation unwinding of the paper of the recorder is continuous, the pen will draw successive curves which start and end on the time axis. The surface delimited by such curve and the time axis represents the quantity of the corresponding gas in the mixture. The timing of such curve with respect to the initiation of the measurement allows to identify the nature of said constituent. In the second, the unwinding is controlled by a step by step mechanism. The paper bears a set of lines the length of which represents the instantaneous flow of gas and the location of said line with respect to the start, figures the nature of said constituent.

Figure 1:
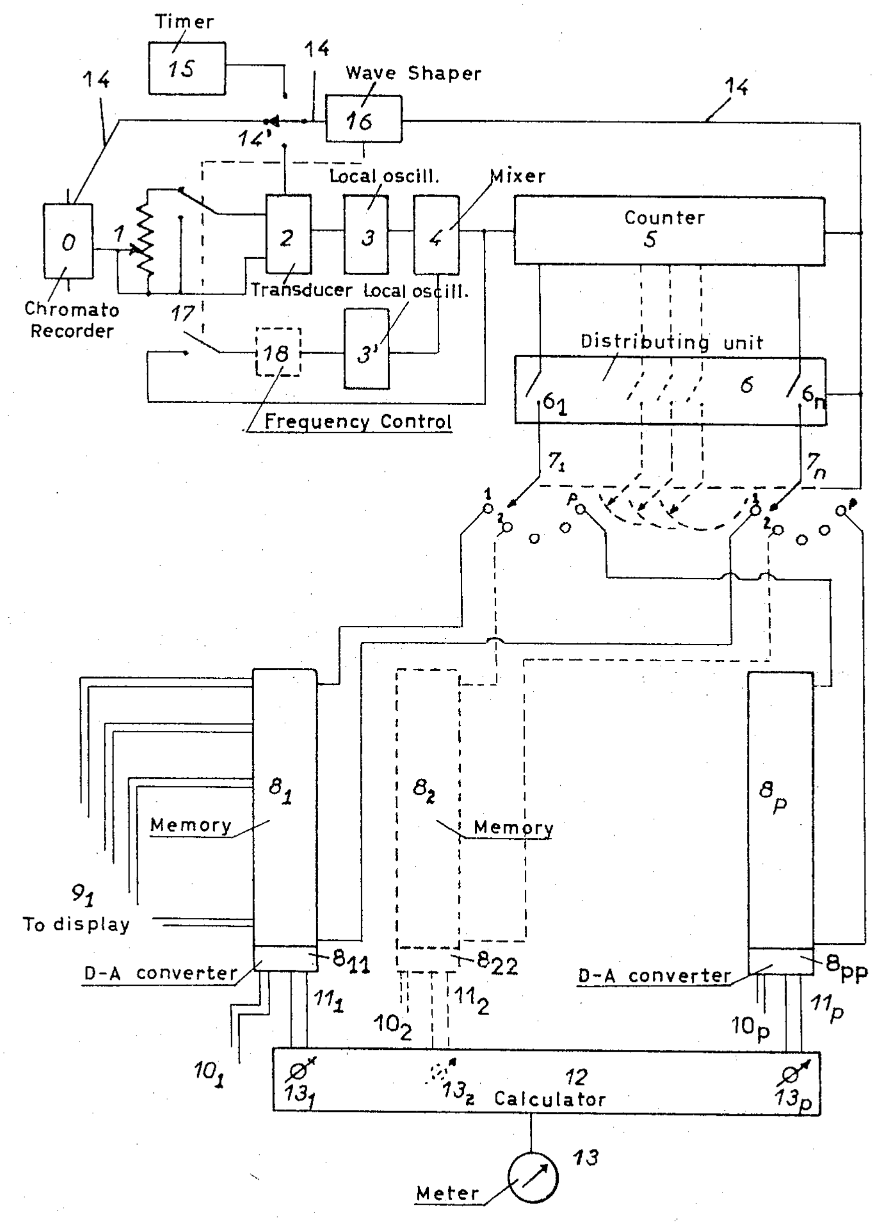
FIGURE 1 is a block diagram of a part of the device according to the invention used to store the quantity of each constituent in a gaseous mixture.

The clock diagram on FIGURE 1 shows an embodiment of the invention associated with a gas analyzer operated according to the first way described above while FIGURES 2 and 4 refer to embodiments of the invention in the case when the analyzer is operated as a peak detector. In the case of the first way of operation, it is necessary to store the integral with respect to time of the recorded curve in order to get the quantitative information required (relative concentration of a given constituent). In the second way of operation the analyzer is operated as a peak value instrument and only the maximum quantity of gas flowing through the column has to be recorded for each constituent. It is usual to associate both embodiments of the device in order to increase the operational abilities of the gas analyzer. But for sake of clarity the networks have been separated. However, the elements which belong to both bear the same reference numerals.

The chromatograph is not shown on the drawings. 0 is a schematic representation of the mechanical drive of the pen of the recorder of the instrument. 1 is a potentiometer driven by 0. It is part of the matching unit of the device according to the invention which is completed by circuit 2 which transforms variations of the resistance of potentiometer 1 into voltage variations. An embodiment for circuit 2 is shown on FIGURE 2. The frequency of local oscillator 3 is modulated according to the output from 2. The frequency modulated signal from 3 is fed to mixer 4 which receives also the output from fixed frequency oscillator 3' set at the same nominal frequency as local oscillator 3. The output from mixer 4 includes a low frequency signal which represents the frequency modulation of 3. Mixer 4 incorporates a low pass filter which transmits only said signal to counter 5 through a wave shaping circuit. Counter 5 comprises $n$ binary stages. The value of $n$ is matched with the precision of the instrument. Counter 5 receives during the measurement pulses the instantaneous frequency of which reproduces the variation of the resistance of potentiometer 1. Counter 5 adds up or integrates the number of pulses received during the measurement. The switching distributor unit 6 connects the counter 5 to the memory unit made of a matrix of $p$ groups of $n$ relays each, $8_1$ $8_2$ . . . $8_p$ through $n$ $p$-position switches $7_1$ $7_2$ . . . $7_n$. The switching unit allows interconnection of each stage of counter 5 to the relay of the same rank belonging to one of the series of $n$ relays 8. The memory comprises as many series ($p$) of relays as the chromatograph is able to identify different constituents, that is the maximum number of information to be stored. Each relay of each series feeds its own two wire output as shown at $9_1$ in the case of relays $8_1$. These outputs are connected either to a display unit or to a transmitter for remote display or automatic control, or any other type of digital utilization. A digital to analog converter $8_{11}$ $8_{22}$ . . . $8_{pp}$ provides for the digital to analog conversion of the information stored in each series of relay and feeds two independent outputs, shown at $10_1$ and $11_1$ from converter $8_{11}$. The analog outputs of the memory are fed to any type of analog utilization circuit. Such a circuit is shown on the drawing as a calculating unit 12. Each stored datum is fed to multiplier stage $13_1$ . . . $13_p$ through lines $11_1$ $11_2$ . . . $11_p$. 12 is an analog multiplier-adder which feeds meter 13. The information from 12 can figure any property of the gaseous mixture related to the relative concentration of each constituent as stored in memory 8, such as calorific power of the mixture. Lines $10_1$ $10_2$ . . . $10_p$ are available for another analog utilization circuit. Zero setting of counter 5 after each partial measurement that is after the diffusion of each constituent and step by step advance of switches $7_1$, $7_2$ . . . $7_n$ are synchronized with the drive of the chromatograph recorder shown at 0 through line 14. As mentioned above in this particular use of the devices according to the invention, the timing generator may be omitted since the instrument (the chromatograph) provides for convenient timing control pulses. However, in the more general case, it is necessary to generate the timing information within the memory device. Such timing generator is shown at 15 which is a timing unit which can be substituted for chromatograph 0 in feeding line 14 through switch 14'. A wave shaping unit 16 is provided on line 14 in order to deliver pulses matched to counter 5 and switching unit 6 and 7. Switch 14' is a three position switch in order to feed wave shaper 16 either with the output from the timing unit 15, the output from the instrument recorder 0 or directly from the matching unit 2. Some different operations require switching according to the value of the measured parameter as delivered by 2. Wave shaping unit 16 controls the checking and zero testing circuit for the device. This checking circuit is made of a double switch 17 which is presented in the position it occupies during storage of the output from the instrument. When connected to the other contact, switch 17 disconnects apparatus 0 from the device and connects a frequency control circuit 18 for local oscillator 3' between mixer 4 and auxiliary local oscillator 3' in order to check the value of the nominal frequency from such oscillator to be equal to the nominal value of the frequency of oscillator 3. Indeed, it is necessary that in the absence of any signal from the instrument, the stored value in the memory should be zero. In other words, no pulse should be received by counter 5. Any frequency shift of oscillators 3 and 3' one with respect to the other is to be compensated for from time to time to prevent any systematic error in the stored value. Frequency controlling circuit 18 is a potentiometer controlled through a servomotor fed by the output from 4. In some embodiments, it may be possible to use a local oscillator 3 the nominal frequency of which is zero. In this case, there is no need for local oscillator 3' nor any of the zero resetting circuit elements just described. In this case, mixer 4 is restricted to a low pass filter.

FIGURE 2 shows an embodiment of the invention in the case when the values to be stored are peak values from the chromatograph analyzer for each gaseous constituent. As previously described, potentiometer 1 and transistor stage 2 constitute the matching unit which transduces the output from instrument recorder 0 into resistance variation of potentiometer 1 which are transformed into voltage variation at D by transistor stage 2. Indeed, as well known, the collector current of stage 2 is independent from the value of the resistance of potentiometer 1 within a very wide range of variation of said resistance. The potential at D which follows the same time variation law as the output from the chromatograph analyzer is applied to capacitor $C_{20}$ and to a resistor capacitor network 21. The charge across $C_{20}$ will build up according to the potential at D. Voltage across resistor $R_{21}$ is the differential with respect to time of the potential at D. As long as potential at D increases, that is as long as the flow of gas through the chromatograph increases, the charge across $C_{20}$ increases and voltage across $R_{21}$ increases. When maximum flow is reached, the resistance of potentiometer 1 begins to decrease and voltage across $R_{21}$ changes sign. The sign reversal pulse is applied to a chopped amplifier 22 which is only sensitive to negative polarity pulses. The first pulse triggers bistable stage 22' which is used as a wave shaping network which controls switch 23 so as to disconnect capacitor 20 from its charging network and to connect said capacitor to its discharging network shown as resistance $R_{24}$ at the input of the frequency modulated oscillator 3. When switch 23 is controlled through bistable stage 22', the charge built up across capacitor $C_{20}$ corresponds to the maximum value of the gas flow through the chromatograph. As is well known, when a capacitor discharges through a constant resistance ($R_{24}$), an exponential decrease with respect to time is obtained. As will be explained in detail later (refer to FIGURE 5) the integral with respect to time of the instantaneous value of the charge across the capacitor during discharge is proportional to the peak value of said charge. As mentioned before, integration with respect to time of the instantaneous value of the frequency of oscillator 3 is obtained in counter 5. The duration of said integration is set by bistable stage 22' which controls starting and stopping of the counter 5. Switch 23 is automatically reset through a delay switch not shown on the drawing the time constant of which is very high with respect to the discharge time constant of capacitor $C_{20}$ through resistor $R_{24}$.

In the devices according to the invention corresponding to the embodiment of FIGURE 1, the frequency of oscillators 3 and 3' may be chosen rather low, about a few hundreds of cycles per second. When the memory device has to store instantaneous values as shown on the embodiment of FIGURE 2, it is necessary to use higher local oscillator frequencies such that the frequency value be high with respect to the reciprocal of the time constant of the discharge circuit of capacitor $C_{20}$. In a particular embodiment, a frequency of 1500 cycles per second has been selected.

FIGURE 3 shows in detail the switching distributing unit 7 and the buffer circuit 6 which interconnects counter 5 to memory 8. The binary stages of counter 5 are shown at $5_1$, $5_2$, $5_n$. Buffer circuit 6 comprises *n* transistors $30_1$ $30_2$ . . . $30_n$. The base electrode of each transistor 30 is connected to the collector electrode of the same transistor in each binary stage. The collector electrodes of transistors $30_1$, $30_2$ etc. are connected through switches $7_1$, $7_2$ . . . $7_n$ to the actuating coil of relay $31_1$, $31_2$, etc. which constitute series $8_1$ of memory 8. The relays 31 are of the self maintaining type, that is once closed, they remain closed until another external control opens them. When a partial measurement is over, a reading and zero setting pulse is applied through line 0 to the emitters of all the transistors 30. If the electrical state of the corresponding binary stage allows it this pulse is transmitted to the actuating coil 31 of the associated relay which will close. The self maintaining circuit $I31_1$ is closed and relay $31_1$ will keep closed owing to the current which flows through resistor $R31_1$ connected to a supply source. The self maintaining circuits associated to the other relays of the same memory series such as $I31_2$, $I31_n$ are fed from the same supply source through similar resistors. A common switch I40 is connected in the return circuit of said supply. As shown, if switch 40 is closed, all the relays which constitute series $8_1$ of the memory are reset. Since switch I40 is connected in parallel with each of the self maintaining circuits of the relays of this series, when I40 is closed, all the relays are opened.

Figure 4:
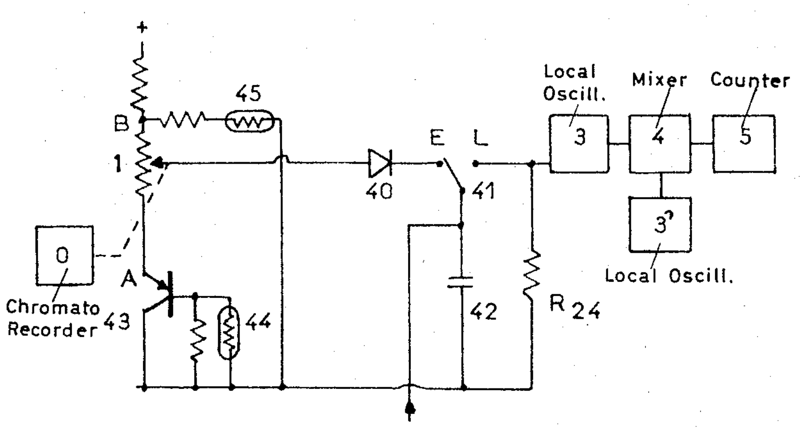
FIGURE 4 shows another embodiment of the device of the type on FIGURE 2.
Figure 5:
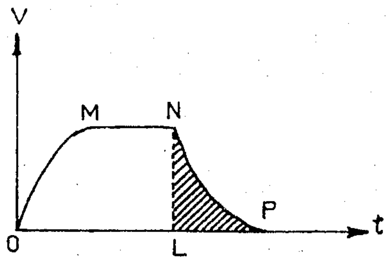
FIGURE 5 is a curve explaining the operation of a circuit shown on FIGURE 4.

FIGURE 4 shows another embodiment of the invention in the case when the memory device is to store the peak value of the flow of each constituent through the diffusion column of the gas chromatograph. As previously described potentiometer 1 is driven by the pen recorder 0 of the gas analyzer. This potentiometer is fed at constant current. The output signal is collected between point A and the slide and applied to capacitor 42 through a unidirectional device 40 and transistor 43, the object of which will be explained later on. The current which flows through 40 builds up charges across capacitor 42 when two way switch 41 is in the position shown (contact E closed). The polarity of 40 is chosen with respect to the polarity of the output voltage from potentiometer 1 in order that the current through 40 increases when the slide of potentiometer 1 is moved in the direction corresponding to an increase of gas flow through the gas chromatograph analyzer. The charge across 42 at the end of a partial measurement, that is at the end of the diffusion of a given constituent of the gas mixture, is a function of the maximum signal across potentiometer 1 since capacitor 42 cannot discharge through unidirectional device 40, the reverse impedance of which is practically infinite. When the diffusion of said constituent is over, switch 41 closes the circuit at L and capacitor 42 will discharge through load resistor $R_{24}$ at the input of the frequency modulated oscillator 3 as was mentioned above. Switch 41 closes the circuit at L for a predetermined duration. The curve of FIGURE 5 shows the charge or voltage across capacitor 42 with respect to time. When the potential difference between point A and the slide of potentiometer 1 increases, the voltage across 42 increases according to curve OM. As long as the potential difference at the output of potentiometer 1 keeps on increasing voltage across 42 increases. When potential difference between point A and the slide begins to decrease, the voltage across 42 should decrease. This is rendered impossible owing to the very high reverse resistance of undirectional device 40. Therefore, the voltage across 42 is kept constant as shown at MN on the curve until time L when switch 41 changes from position E to position L. At this time, the capacitor 42 discharges through resistor $R_{24}$ and the voltage across 42 decreases according to curve NP. It is well known that the hatched area limited by the discharge curve of capacitor 42, the time axis and the parallel to the voltage axis passing by point L is proportional to the charge built up across capacitor 42, that is proportional to the peak value of the potential difference at 1 and thereby to the peak value of the flow of a given constituent through the gas analyzer. The instantaneous value of the signal applied to counter 5 through oscillator 3 and mixer 4 is proportional to the instantaneous ordinate of curve NP. Thereby, the count displayed by counter 5 at time *p* is proportional to such peak value of the gas flow owing to the integral action of the counter.

The unidirectional devices commercially available for use as 40 show a few defects as far as this particular application is concerned. The first is that their direct resistance is not zero. Therefore, there is a slight drop of potential across 40 and the potential across capacitor 42 is the potential difference across potentiometer 1 less the internal voltage drop through device 40. Experience has shown that in the current range corresponding to practical applications, the internal voltage drop of the semiconductor silicon diode is independent from the current which flows through said diode. Therefore, means are provided for introducing between point A of the potentiometer and the supply source, a constant voltage source of a value equal to the internal voltage drop across such silicon diode. Constant voltage sources are well known per se. In the embodiment described, such source consists of the emitter to collector circuit of transistor 43 which is fed with a constant collector to base voltage. The second defect of commercially available semiconductor devices is that the internal voltage drop in the direct condition varies with temperature. To compensate for such variation, means are provided to reproduce such temperature variation at points A and B of potentiometer 1. Owing to the properties of the transistors such as used at 43, the potential at point A will vary also with temperature in the right direction. However, this variation is not sufficient and a negative temperature coefficient resistor 44 has to be added in the transistor supply. To keep the current constant through potentiometer 1, it is necessary that potential variations at point A be reproduced at point B. This is obtained through the use of negative temperature coefficient resistor 45.

Switch 41 is controlled by the time generator unit 15. As mentioned above in this particular application of the invention, the timing signals are obtained directly from the instrument.

We claim:

1. An analog input digital memory device comprising:
   means for converting the information to be stored into electrical signals;
   means for changing said signals to analog voltages;
   a first local oscillator;
   means for modulating the frequency of said oscillator in accordance with said analog voltages;
   a digital counter;
   a second local oscillator operating at the nominal frequency of said first local oscillator;
   means for combining the output of said first and second local oscillators, and for supplying a resultant signal to said digital counter;
   a switching matrix connected to the output of said counter;
   memory means connected to the output of said switching matrix;
   and a timing generator connected to said counter, switching unit, and memory for controlling the operation thereof.

2. An analog input digital memory device comprising:
   a potentiometer arranged to be driven by external means;
   means connected to said potentiometer for converting the output thereof into an analog voltage;
   a first local oscillator;
   means for modulating the frequency of said oscillator with said analog voltage;
   a digital counter;
   a second local oscillator operating at the nominal frequency of said first local oscillator;
   means connected to said first and second local oscillators and to said digital counter for combining the output of said oscillators to supply a resultant signal to said counter;
   a switching matrix connected to the output of said counter;

memory means connected to the output of such switching matrix;
   and a timing generator connected to the said counter, said switching matrix and said memory for controlling the operation thereof.

3. Apparatus as defined by claim 2, in which said first mentioned means comprises an analog signal circuit connected between the moveable arm of said potentiometer and one end of said potentiometer and includes a unidirectional device connected in series with a capacitor and a source of constant D.C. voltage.

4. Apparatus as defined by claim 3, wherein said constant voltage source comprises a temperature compensated transistorized circuit for offsetting voltage drops developed across said unidirectional device.

5. Digital electric storing apparatus comprising:
   input means for supplying a plurality of analog signals occurring in sequence each of which is to be independently stored;
   a transducing unit to transform said analog signals into analog voltages;
   converter means to provide a fluctuating output signal, the frequency of which is proportional to the amplitude of said analog voltages;
   an electronic counter;
   means to supply the output signal from said converter means to said counter;
   a switching matrix unit comprising a set of stepping switches;
   a timing unit;
   a plurality of memory means;
   means to apply the output signal from said counter through said switching unit to one of said memory means;
   means responsive to said timing unit for stepping said switches of said matrix unit;
   means responsive to said timing unit to reset said counter to zero;
   a plurality of digital to analog converters;
   means to connect one of said digital to analog converters to each of said plurality of memory means;
   and an output means connected to said digital to analog converter means.

References Cited by the Examiner

UNITED STATES PATENTS

| | | | |
|---|---|---|---|
| 2,378,383 | 6/1945 | Arndt | 340—172.5 |
| 2,775,754 | 12/1956 | Sink. | |
| 2,905,821 | 9/1959 | Younkin. | |
| 3,040,294 | 6/1962 | Lee et al. | 340—172.5 |
| 3,094,862 | 6/1963 | Burk | 328—151 |
| 3,103,578 | 9/1963 | Dietrich | 235—150 |
| 3,121,160 | 2/1964 | Burk | 235—151 |
| 3,143,643 | 8/1964 | Fluegel et al. | 235—151 |
| 3,148,353 | 9/1964 | Schumann | 328—151 |
| 3,185,821 | 5/1965 | Lee et al. | 235—193 |
| 3,185,827 | 5/1965 | Herndon | 235—197 |

MALCOLM A. MORRISON, *Primary Examiner.*

I. KESCHNER, *Assistant Examiner.*